US011845663B2

United States Patent
Liu et al.

(10) Patent No.: US 11,845,663 B2
(45) Date of Patent: Dec. 19, 2023

(54) METHOD FOR INTEGRALLY FORMING GRAPHENE FILM (GF) OF HIGH SPECIFIC SURFACE AREA (SSA) BY ULTRAFAST ULTRAVIOLET (UV) LASER PROCESSING

(71) Applicant: GUANGDONG UNIVERSITY OF TECHNOLOGY, Guangzhou (CN)

(72) Inventors: Huilong Liu, Guangzhou (CN); Yun Chen, Guangzhou (CN); Xin Chen, Guangzhou (CN); Yixin Zheng, Guangzhou (CN); Kyoung-Sik Moon, Guangzhou (CN); Dachuang Shi, Guangzhou (CN); Jian Gao, Guangzhou (CN); Ching-Ping Wong, Guangzhou (CN)

(73) Assignee: GUANGDONG UNIVERSITY OF TECHNOLOGY, Guangzhou (CN)

(*) Notice: Subject to any disclaimer, the term of this patent is extended or adjusted under 35 U.S.C. 154(b) by 0 days.

(21) Appl. No.: 18/146,378

(22) Filed: Dec. 25, 2022

(65) Prior Publication Data
US 2023/0357016 A1    Nov. 9, 2023

(30) Foreign Application Priority Data

May 5, 2022  (CN) .......................... 202210482715.X (51) Int. Cl.
  *C01B 32/184* (2017.01)
  *C01B 32/196* (2017.01)
(52) U.S. Cl.
  CPC .......... *C01B 32/184* (2017.08); *C01B 32/196* (2017.08); *C01P 2002/82* (2013.01); *C01P 2002/85* (2013.01); *C01P 2004/04* (2013.01)

(58) Field of Classification Search
  CPC . C01B 32/184; C01B 32/196; C01P 2002/82; C01P 2002/85; C01P 2004/04
  See application file for complete search history.

(56) References Cited

U.S. PATENT DOCUMENTS

| 10,392,256 B2 | 8/2019 | Sun et al. |
| 10,611,641 B2 | 4/2020 | Ferry |
| 10,843,145 B2 | 11/2020 | Marques Abrantes et al. |

FOREIGN PATENT DOCUMENTS

| CN | 112967889 A | 6/2021 |
| WO | 2018085789 A1 | 5/2018 |

OTHER PUBLICATIONS

English machine translation of CN112967889A (2021).*

(Continued)

*Primary Examiner* — Richard M Rump
(74) *Attorney, Agent, or Firm* — True Shepherd LLC; Andrew C. Cheng (57) ABSTRACT

A method for integrally forming a graphene film (GF) of a high specific surface area (SSA) by ultrafast ultraviolet (UV) laser processing, includes: selecting a carbon precursor material, where the carbon precursor material is one selected from the group consisting of a biomass/hydrogel composite and a heavy hydrocarbon compound; adding an activator solution to an inside of the carbon precursor material to obtain a composite with an activator uniformly loaded, and spreading the composite on a flexible substrate to form a carbon precursor material layer; heating and drying the carbon precursor material layer; in-situ processing with an ultrafast UV laser to obtain an activated GF of a high SSA; and cleaning and drying the activated GF. With the method of the present disclosure, a microporous activated GF of a high SSA can be directly processed in-situ on a flexible substrate.

6 Claims, 8 Drawing Sheets

(56) References Cited

OTHER PUBLICATIONS

Chyan, Yieu, et al. "Laser-induced graphene by multiple lasing: toward electronics on cloth, paper, and food." ACS nano 12.3 (2018): 2176-2183.*

Meng, Lingyin, et al. "A green route for lignin-derived graphene electrodes: A disposable platform for electrochemical biosensors." Biosensors and Bioelectronics 218 (2022): 114742.*

Hui Liu, Superhydrophilic, Ambient-air in situ fabrication of high-surface-area, and microporous few-layer activated graphene films by ultrafast ultraviolet laser for enhanced energy storage, Nano Energy, pp. 1-14, China.

* cited by examiner

METHOD FOR INTEGRALLY FORMING GRAPHENE FILM (GF) OF HIGH SPECIFIC SURFACE AREA (SSA) BY ULTRAFAST ULTRAVIOLET (UV) LASER PROCESSING

CROSS REFERENCE TO RELATED APPLICATION

This application claims priority to the Chinese Patent Application No. 202210482715.X with a filing date of May 5, 2022. The content of the aforementioned application, including any intervening amendments thereto, is incorporated herein by reference.

TECHNICAL FIELD

The present disclosure relates to the technical field of graphene film (GF) preparation, and in particular to a method for integrally forming a GF of a high specific surface area (SSA) by ultrafast ultraviolet (UV) laser processing.

BACKGROUND

A microporous GF (of a pore size of less than 2 nm) not only retains the characteristics of graphene such as high electrical conductivity, high strength, and high chemical stability, but also has high SSA and excellent flexibility. Thus, microporous GFs have attracted wide attention in the field of flexible miniature energy storage devices.

Traditionally, a microporous GF is prepared through a multi-step process, where a reduced or microwave-peeled graphene oxide (GO) powder is mixed with an activator and a resulting mixture is placed in a tube furnace filled with an inert gas and activated at a high temperature or under a microwave, which limits the spatial and temporal resolution; and then an activated GF is prepared through a multi-step film-forming process, which reduces the extensive commercial application potential of microporous GFs. In addition, although a binder is introduced into a microporous GF prepared by the traditional process, the microporous GF still has poor flexibility and is brittle, which limits the large-scale production of microporous GFs.

There is another preparation method where a composite film with microwave-peeled GO and potassium hydroxide is prepared through oil bathing and vacuum filtration and then subjected to long-term high-temperature activation in a tube furnace. A quality and a size of a film prepared by the above process will be limited by a diameter of a vacuum filter membrane or a furnace tube (at a centimeter level), and thus the film may have problems such as local deformation and poor folding performance, which makes it difficult to use the film in flexible in-plane miniature energy storage devices.

Therefore, the efficient and highly-controllable processing of a microporous GF of a large area and flexibility for flexible micro-nano energy storage devices and wearable electronic devices is still challenging.

SUMMARY

The present disclosure is intended to provide a method for integrally forming a GF of a high SSA by ultrafast UV laser processing. With the method of the present disclosure, a microporous activated GF of a high SSA can be directly processed in-situ on a flexible substrate, which meets the demand for microporous electrodes of a high SSA in the field of flexible miniature energy storage devices, and solves the problems such as process complexity, high cost, and poor controllability faced by the process of fabricating an activated microporous GF in the prior art.

In order to achieve the above objective, the present disclosure adopts the following technical solutions:

A method for integrally forming a GF of a high SSA by ultrafast UV laser processing is provided, including the following steps:

S1: selecting a carbon precursor material, where the carbon precursor material is one selected from the group consisting of an aromatic polymer, a biomass/hydrogel composite, and a heavy hydrocarbon compound;

S2: adding an activator solution to a surface layer or an inside of the carbon precursor material to obtain a composite with an activator uniformly loaded on the surface layer or inside, and spreading the composite on a flexible substrate to form a carbon precursor material layer;

S3: heating and drying the carbon precursor material layer obtained in S2 to obtain a composite film in which an activator crystal is loaded on the surface layer of or inside the carbon precursor material;

S4: in-situ processing the composite film obtained in S3 by an ultrafast UV laser to obtain an activated GF of a high SSA, where a power of a picosecond UV laser is set to be no less than 5.5 W to 6 W; and S5: cleaning and drying the activated GF.

Further, in S1, the aromatic polymer is one selected from the group consisting of polyimide (PI), polyetherimide (PEI), polyamideimide (PAI), polyetheretherketone (PEEK), a phenolic resin, and a polybenzoxazine resin film; the biomass/hydrogel composite is obtained by compounding a biomass with a hydrogel, where the biomass includes lignin, cellulose, hemicellulose, and chitin and the hydrogel includes gelatin, polyvinyl alcohol (PVA), and polyacrylamide (PAM); and the heavy hydrocarbon compound includes coal, tar, and asphalt.

Further, in S2, the activator may be any one selected from the group consisting of potassium hydroxide, zinc chloride, sodium hydroxide, potassium carbonate, copper chloride, and phosphoric acid.

Further, in S2, the carbon precursor material layer has a thickness of no less than 30 μm; when the carbon precursor material is an aromatic polymer, the activator is added to the surface layer of the carbon precursor material, and the activator crystal has a thickness of no more than 10 μm; and when the carbon precursor material is one selected from the group consisting of a biomass/hydrogel composite and a heavy hydrocarbon compound, the activator is added inside the carbon precursor material, and a mass ratio of the carbon precursor material to the activator is 2:(1.5-4).

Further, in S2, the flexible substrate has a rough surface; or a smooth surface of the flexible substrate is processed by a high-energy beam to form a microstructure array; or
a smooth surface of the flexible substrate is treated with plasma to form a superhydrophilic surface.

Further, in S3, when the activator is potassium hydroxide, zinc chloride, sodium hydroxide, or potassium carbonate, a dilute acid solution is used for neutralization after activation in S5; and when the activator is copper chloride or phosphoric acid, a dilute alkali solution is used for neutralization after activation in S5.

Further, in S3, the carbon precursor material layer is heated and dried on a heating plate or in a vacuum drying oven to allow crystallization in the activator solution, where the heating is conducted at 60° C. to 100° C. for 5 min to 30 min.

Further, in S4, progressive parallel scanning is conducted with the ultrafast UV laser at a scanning speed of 40 mm/s to 60 mm/s and a scanning pitch of 24 μm to 28 μm; a spot diameter of the ultrafast UV laser is 6 to 10 times the scanning pitch; and the ultrafast UV laser has a wavelength of 200 nm to 360 nm and a pulse width of less than 12 ps.

Further, the in-situ processing with the ultrafast UV laser is conducted in an air environment, a vacuum environment, an inert gas-protected environment, or an oxygen/inert gas mixed gas environment;

an inert gas is any one selected from the group consisting of nitrogen, argon, and a sulfur hexafluoride gas; and in the oxygen/inert gas mixed gas environment, a mass ratio of oxygen to an inert gas is not higher than 25%.

Further, in S5, the activated GF is soaked for 5 min to 20 min in a neutralization solution and warm deionized water at 60° C. to 70° C. successively, then soak-cleaned multiple times in cold deionized water until resulting cold deionized water is neutral, and then dried in a vacuum drying oven at a temperature of 40° C. to 60° C. and a relative vacuum degree of −90±2 kPa.

The technical solutions provided by the present disclosure may have the following beneficial effects:

1. In the method for integrally forming a GF of a high SSA by in-situ processing based on ultrafast UV laser induction and activation provided by the present disclosure, a biomass/hydrogel composite or a heavy hydrocarbon compound is selected as a carbon precursor material, and the carbon precursor material is doped with an activator, then spread on a flexible substrate, dried, and processed in-situ with an ultrafast UV laser to form an activated GF of a high SSA. Based on the large area and flexibility of the flexible substrate and the selection of the carbon precursor material, an activated GF of a large area and a high SSA can be efficiently fabricated, which involves a simple process, has strong controllability, and is conducive to the industrial large-scale production.
2. In the present disclosure, a flexible substrate is used to support a carbon precursor material, and the generation of graphene of a high SSA is completed on the flexible substrate, which is conducive to improving the flexibility and foldability of a GF and the controllable generation of activated and etched nanopores, does not require secondary transfer and processing, effectively avoids the destruction, collapse, or blockage of nanopores, and improves the effective utilization of SSA of graphene.
3. Through the selection of a processing environment and an activator, the present disclosure can adopt an ultrafast UV laser induction and activation technology to realize the activation and etching of sub-nanopores on a surface of porous graphene and the doping of a small number of heteroatoms.

Figure 2:
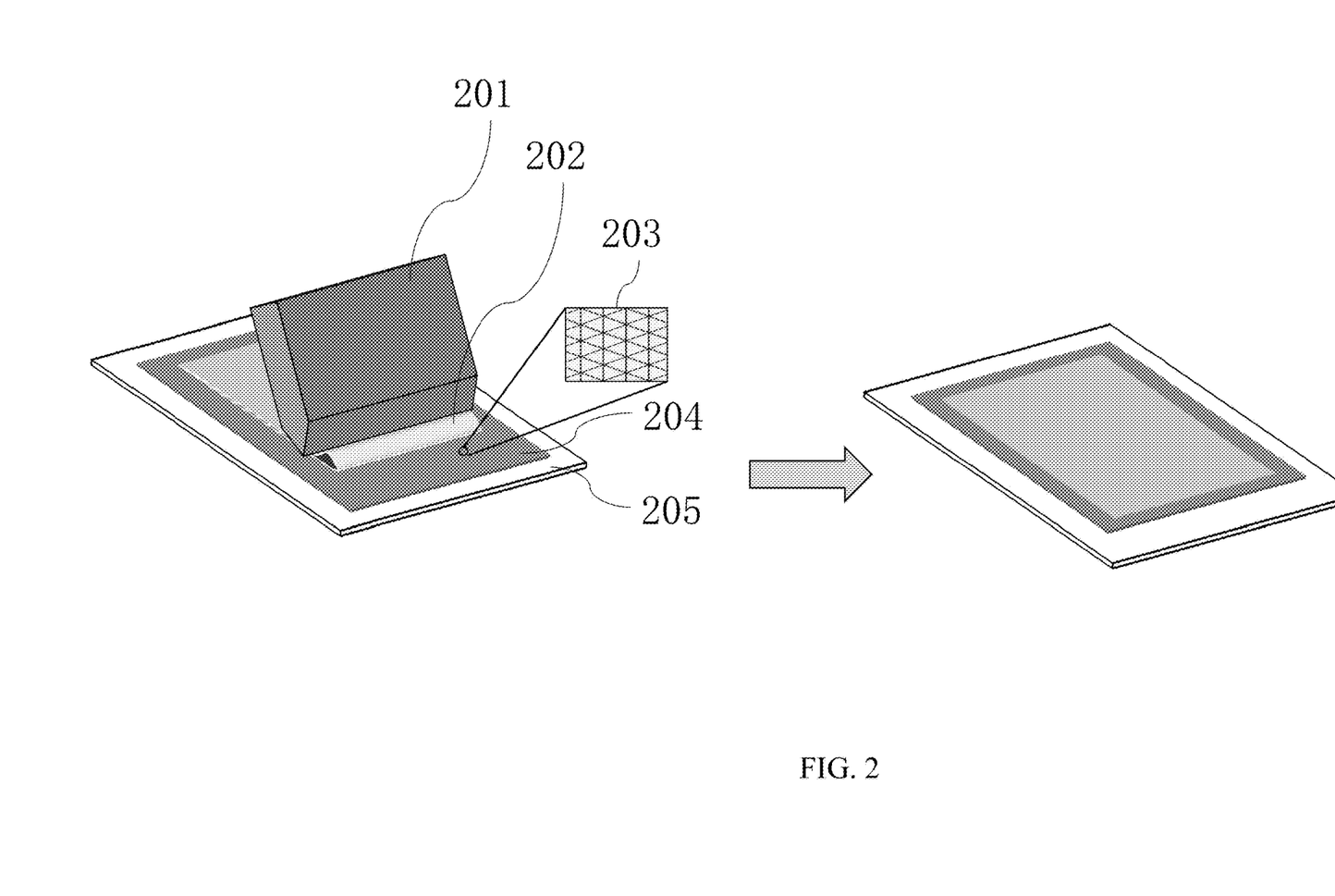
FIG. 2 is a schematic diagram illustrating a process of uniformly coating an activator on a surface of a carbon precursor material according to Example 2 of the present disclosure.
Figure 3:
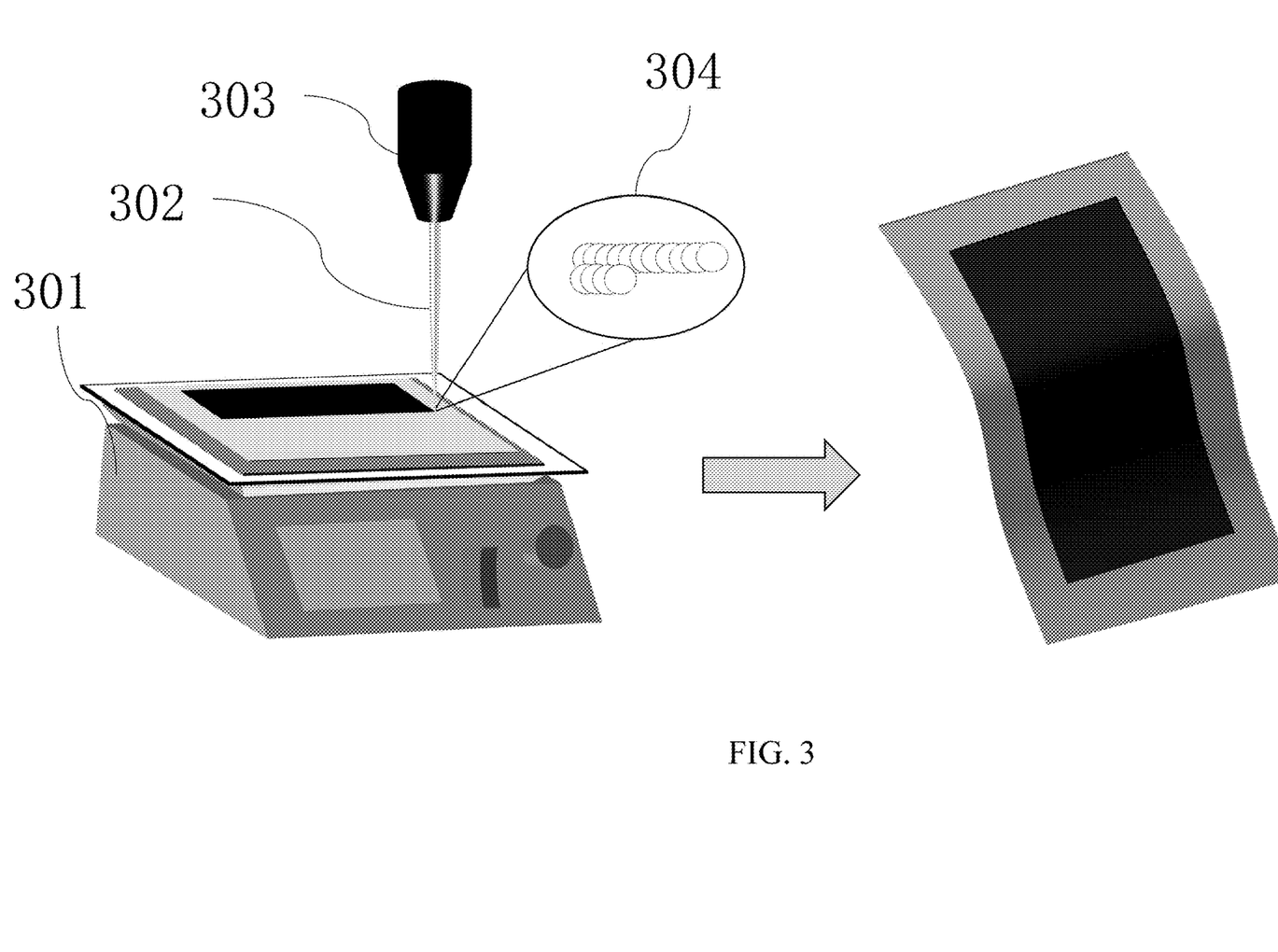
FIG. 3 is a schematic diagram illustrating a process of inducing and activating a GF with a picosecond UV laser according to Example 2 of the present disclosure.
Figure 4:
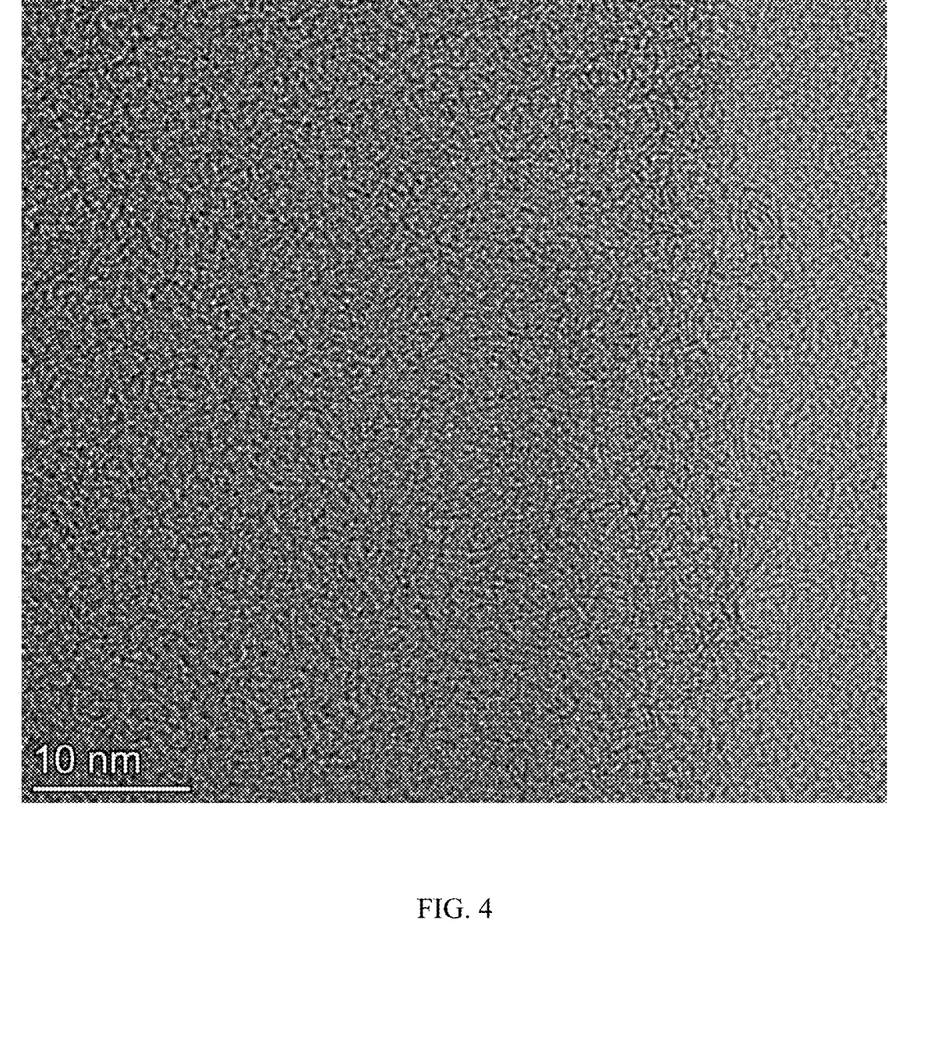
FIG. 4 is a transmission electron microscopy (TEM) image of the GF of a high SSA obtained in Example 2 of the present disclosure.
Figure 5:
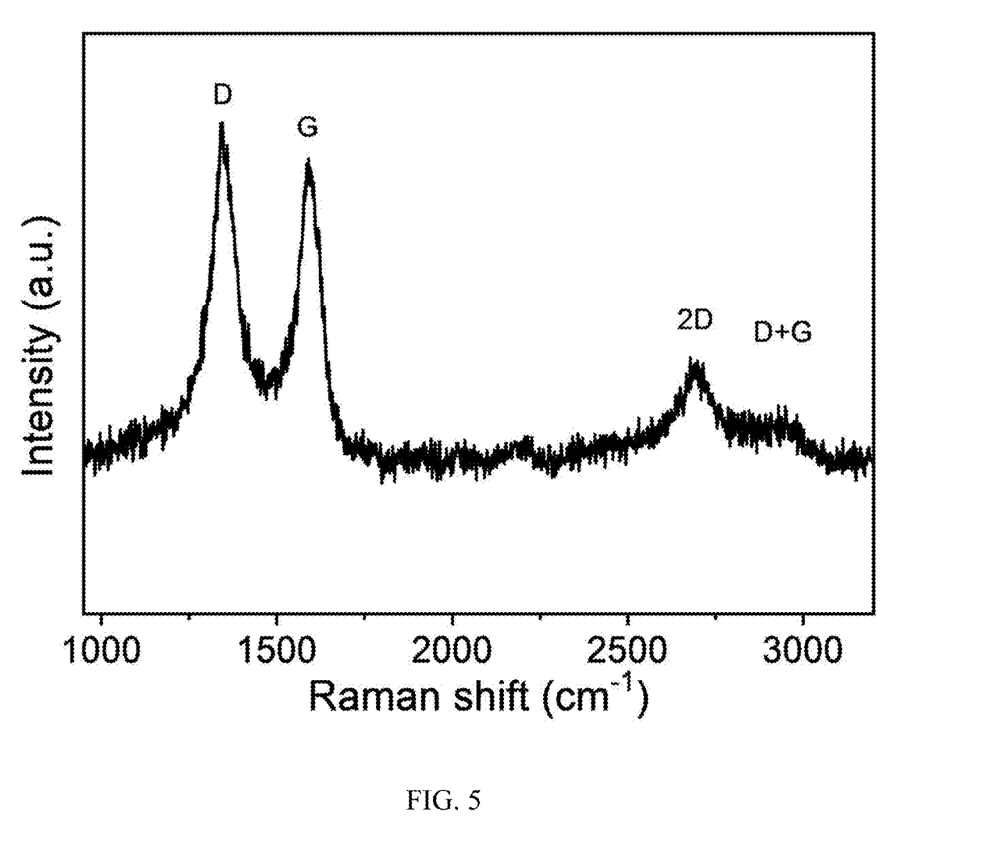
FIG. 5 is a Raman spectrum of the GF of a high SSA obtained in Example 2 of the present disclosure.
Figure 6:
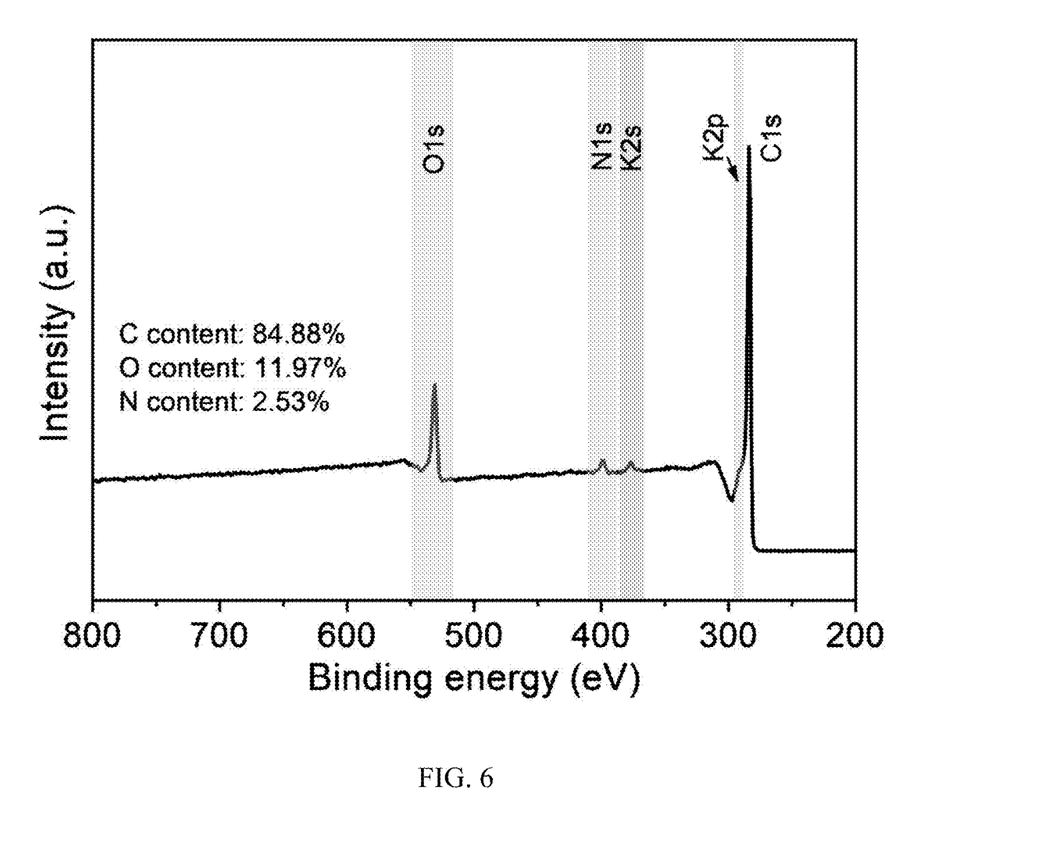
FIG. 6 is a X-ray photoelectron spectroscopy (XPS) spectrum of the GF of a high SSA obtained in Example 2 of the present disclosure.
Figure 7:
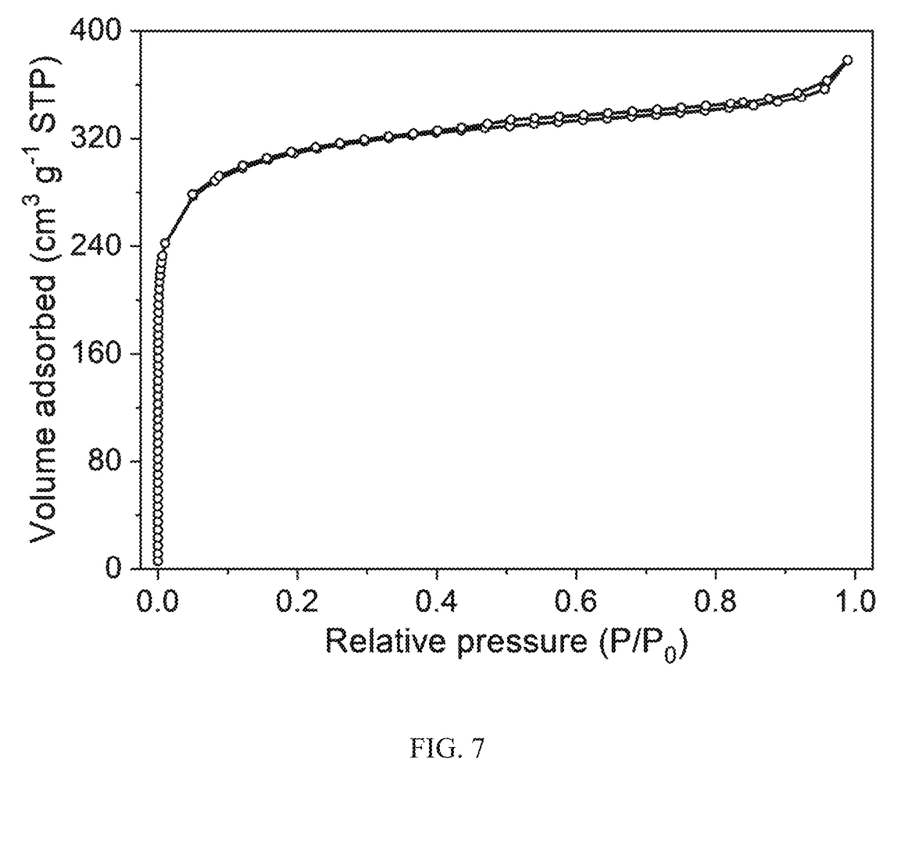
FIG. 7 is a low-temperature nitrogen adsorption and desorption curve of the GF of a high SSA obtained in Example 2 of the present disclosure.
Figure 8:
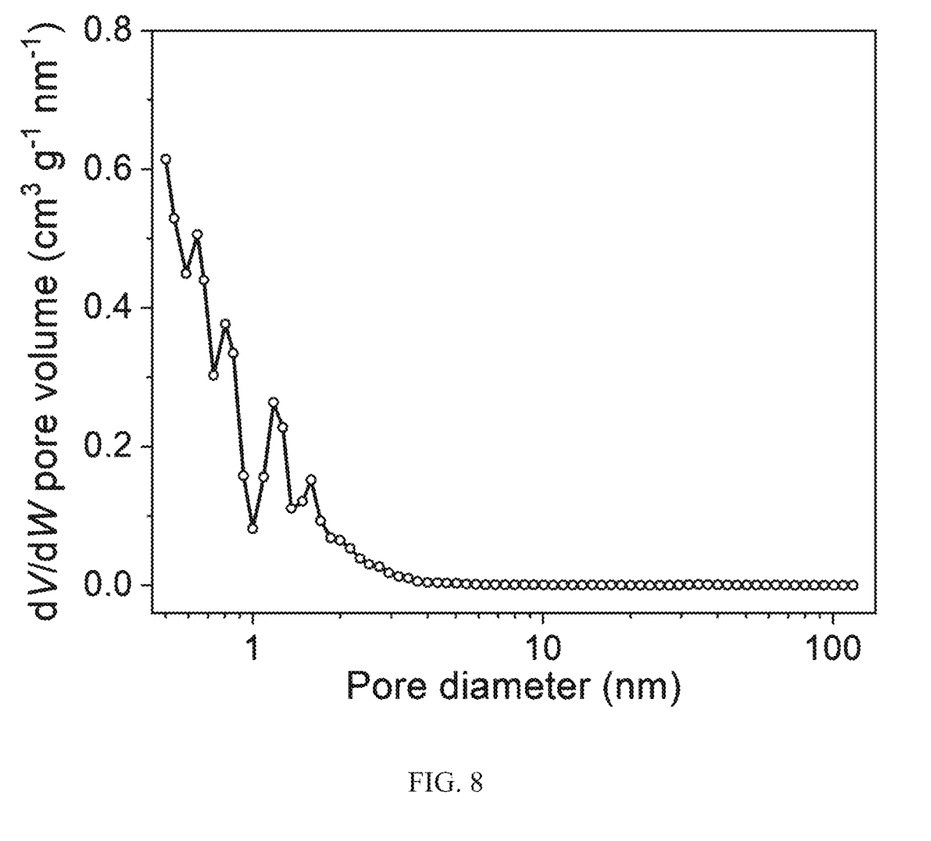
FIG. 8 shows a pore size distribution of the GF of a high SSA obtained in Example 2 of the present disclosure.

In the figures, 201 represents a coating knife, 202 represents an activator-loaded carbon precursor material, 203 represents a microstructure, 204 represents a flexible substrate, 205 represents a substrate plate, 301 represents a heating plate, 302 represents a picosecond UV laser beam, 303 represents a focusing lens, and 304 represents a laser scanning path.

DETAILED DESCRIPTION OF THE EMBODIMENTS

To facilitate the understanding of the present disclosure, the present disclosure will be described comprehensively below. The present disclosure can be implemented in many different forms and is not limited to the examples described herein. On the contrary, these examples are provided such that the disclosure of the present disclosure can be understood thoroughly and comprehensively.

If specific techniques or conditions are not indicated in an example, a process is conducted in accordance with the techniques or conditions described in literatures in the prior art or in accordance with a product specification. All of the used reagents or instruments which are not specified with manufacturers are conventional commercially-available products.

Unless otherwise defined, all technical and scientific terms used herein have the same meaning as commonly understood by those skilled in the technical field of the present disclosure. The terms used in the specification of the present disclosure herein are only for the purpose of describing specific examples, and are not intended to limit the present disclosure. The term "and/or" used herein includes one or more of the associated items listed.

The present disclosure provides a method for integrally forming a GF of a high SSA by ultrafast UV laser processing, including the following steps:

S1: selecting a carbon precursor material, where the carbon precursor material is one selected from the group consisting of an aromatic polymer, a biomass/hydrogel composite, and a heavy hydrocarbon compound;

S2: adding an activator solution to a surface layer or an inside of the carbon precursor material to obtain a composite with an activator uniformly loaded on the surface layer or inside, and spreading the composite on a flexible substrate to form a carbon precursor material layer;

S3: heating and drying the carbon precursor material layer obtained in S2 to obtain a composite film in which an activator crystal is loaded on the surface layer of or inside the carbon precursor material;

S4: in-situ processing the composite film obtained in S3 by an ultrafast UV laser to obtain an activated GF of a high SSA, where a power of a picosecond UV laser is set to be no less than 5.5 W to 6 W; and S5: cleaning and drying the activated GF.

In the method for integrally forming a GF of a high SSA by ultrafast UV laser processing provided by the present disclosure, an aromatic polymer, a biomass/hydrogel composite, or a heavy hydrocarbon compound is selected as a carbon precursor material, and the carbon precursor material is doped with an activator, then spread on a flexible substrate, dried, and processed in-situ with an ultrafast UV laser to form an activated GF of a high SSA. Based on the high area and flexibility of the flexible substrate and the selection of the carbon precursor material, an activated GF of a large area and a high SSA can be efficiently fabricated, which involves a simple process, has strong controllability, and is conducive to the industrial large-scale production.

In the present disclosure, a flexible substrate is used to support a carbon precursor material, and the generation of graphene of a high SSA is completed on the flexible substrate, which is conducive to improving the flexibility and foldability of a GF and the controllable generation of activated and etched nanopores, does not require secondary transfer and processing, effectively avoids the destruction, collapse, or blockage of nanopores, and improves the effective utilization of SSA of graphene.

It should be noted that the high SSA graphene-forming process of the present disclosure includes two parts: part 1: a laser is used to induce a carbon precursor material to produce porous graphene; and part 2: an activator is mixed with the porous graphene under an action of laser cross-overlap scanning to allow a high-temperature activation reaction, thereby improving an SSA of graphene. In the method of the present disclosure, the activator is crystallized by heating, and the activator can fully participate in the activation reaction after being crystallized. Although the activator solution can achieve a specified activation effect, the activator solution will move during laser processing and thus can hardly be controlled.

Furthermore, in S1, the aromatic polymer is one selected from the group consisting of PI, PEI, PAI, PEEK, a phenolic resin, and a polybenzoxazine resin film; the biomass/hydrogel composite is obtained by compounding a biomass with a hydrogel, where the biomass includes lignin, cellulose, hemicellulose, and chitin and the hydrogel includes gelatin, PVA, and PAM; and the heavy hydrocarbon compound includes coal, tar, and asphalt. Since the biomass is a powder, the biomass needs to be first compounded with the hydrogel and then can be spread on the flexible substrate. When the heavy hydrocarbon compound is a solid, the heavy hydrocarbon compound also needs to be compounded with the hydrogel. The biomass/hydrogel composite facilitates the processing of an activated GF of a large area and a high SSA, and can also improve the flexibility and foldability of a product.

Furthermore, in S2, the activator may be any one selected from the group consisting of potassium hydroxide, zinc chloride, sodium hydroxide, potassium carbonate, copper chloride, and phosphoric acid. At a high temperature, the activator is subjected to a chemical reaction with graphene, and some parts of graphene participating in the reaction are released in the form of a gas to leave many nanoscale pores, thereby achieving the etching of nanopores on a surface of graphene and finally forming a GF of a high SSA. The activator can react with graphene to achieve a prominent pore-forming effect.

Furthermore, in S2, the carbon precursor material layer has a thickness of no less than 30 μm; when the carbon precursor material is an aromatic polymer, the activator is added to the surface layer of the carbon precursor material, and the activator crystal has a thickness of no more than 10 μm; and when the carbon precursor material is one selected from the group consisting of a biomass/hydrogel composite and a heavy hydrocarbon compound, the activator is added inside the carbon precursor material, and a mass ratio of the carbon precursor material to the activator is 2:(1.5-4).

There is no upper limit for the thickness of the carbon precursor material layer, but a too-high thickness will deteriorate the flexibility of the carbon precursor material layer. If the thickness of the carbon precursor material layer is less than 30 μm, the ultrafast UV laser may break by the carbon precursor material during processing, resulting in failed processing. Therefore, the thickness of the carbon precursor material layer is required to be no less than 30 μm. The larger the amount of the activator, the better the pore-forming effect. However, if the amount of the activator is too large, the processing of graphene will be affected. When the activator is added to the surface layer of the carbon precursor material, the activator crystal will affect an interaction between the laser and the carbon precursor if being too thick, and thus it is preferred to limit a thickness of the activator crystal to less than 10 μm. When the activator is added inside the carbon precursor material, a mass ratio of the carbon precursor material to the activator is limited to 2:(1.5-4), which can achieve a prominent processing effect.

Furthermore, in S2, the flexible substrate has a rough surface; or when the flexible substrate has a smooth surface, the smooth surface is processed with a high-energy beam such as a laser beam, an electron beam, or an ion beam to form a microstructure array on the smooth surface or treated with plasma to form a superhydrophilic surface. The microstructure array may be a regular-triangle, square, or hexagonal boss array. As a result, the carbon precursor material can be well attached to the flexible substrate with a rough surface, a microstructure array, or a superhydrophilic surface, and the processed GF has prominent flexibility and foldability. The flexible substrate is fixed on a substrate plate with an adhesive or a preload. That is, the flexible substrate is adhered to the substrate plate with an adhesive to ensure that the flexible substrate will not be deformed during laser processing; or the flexible substrate is spread on the substrate plate, and both ends of the flexible substrate are fixed with a coil. The flexible substrate is a material that does not deform when stretched, and optionally, the flexible substrate is a PI paper.

Furthermore, in S3, when the activator is potassium hydroxide, zinc chloride, sodium hydroxide, or potassium carbonate, the neutralization solution is a dilute acid solution, and optionally, the dilute acid solution is a hydrochloric acid or acetic acid solution; and when the activator is copper chloride or phosphoric acid, the neutralization solution is a dilute alkali solution, and optionally, the dilute alkali solution is a potassium hydroxide or sodium carbonate solution.

Furthermore, in S3, the carbon precursor material layer is heated and dried on a heating plate or in a vacuum drying oven to allow crystallization in the activator solution, where the heating is conducted at 60° C. to 100° C. for 5 min to 30 min.

Furthermore, in S4, progressive parallel scanning is conducted with the ultrafast UV laser at a scanning speed of 40 mm/s to 60 mm/s and a scanning pitch of 24 μm to 28 μm;

a spot diameter of the ultrafast UV laser is 150 μm to 300 μm; the spot diameter of the ultrafast UV laser is 6 to 10 times the scanning pitch; and the ultrafast UV laser has a wavelength of no more than 355 nm and a pulse width of less than 12 ps.

Since the chemical reaction between the activator and the graphene takes a specified period of time and a too-high laser speed will limit a processing thickness, the laser can hardly penetrate by the carbon precursor material layer. A too-low laser speed will lead to very low processing efficiency, which is not conducive to the industrial production. Therefore, a scanning speed is first set to 40 mm/s to 60 mm/s to achieve a prominent processing effect. In addition, the shorter the laser wavelength, the more the photon energy provided, which will promote the activation of graphene to produce developed holes; and the smaller the pulse width of the laser, the higher the instantaneous energy density provided, which is conducive to the processing of a GF with micro-nano porous structures. In the present disclosure, the wavelength of the ultrafast UV laser is limited to 200 nm to 360 nm and the pulse width of the ultrafast UV laser is limited to less than 12 ps, such that an ideal activation effect can be achieved to obtain a GF of a high SSA.

Furthermore, the in-situ processing with the ultrafast UV laser is conducted in an air environment, a vacuum environment, an inert gas-protected environment, or an oxygen/inert gas mixed gas environment;

an inert gas is any one selected from the group consisting of nitrogen, argon, and a sulfur hexafluoride gas; and in the oxygen/inert gas mixed gas environment, a mass ratio of oxygen to an inert gas is not higher than 25%.

It should be noted that, in order to prevent the deliquescence of the activator crystal in the air environment, during the in-situ processing with the ultrafast UV laser, a heating plate is used to continuously maintain the processing environment at 95° C. until the processing is completed. When the processing environment is an oxygen/inert gas mixed gas environment, in order to prevent excessive oxygen-containing groups from being introduced into the graphene, the mass ratio of oxygen to an inert gas is limited to no more than 25%.

Furthermore, in S5, the activated GF is soaked for 5 min to 20 min in a neutralization solution and warm deionized water at 60° C. to 70° C. successively, then soak-cleaned multiple times in cold deionized water until resulting cold deionized water is neutral, and then dried in a vacuum drying oven at a temperature of 40° C. to 60° C. and a relative vacuum degree of −90±2 kPa.

The activated GF is soaked in the neutralization solution to remove the excessive activator, and the warm deionized water at 60° C. to 70° C. has a prominent cleaning effect and can remove the residual activator in the nanopores. The restriction of the drying environment for the activated GF can prevent nanopores of the activated GF from collapsing during the drying process.

Figure 1:
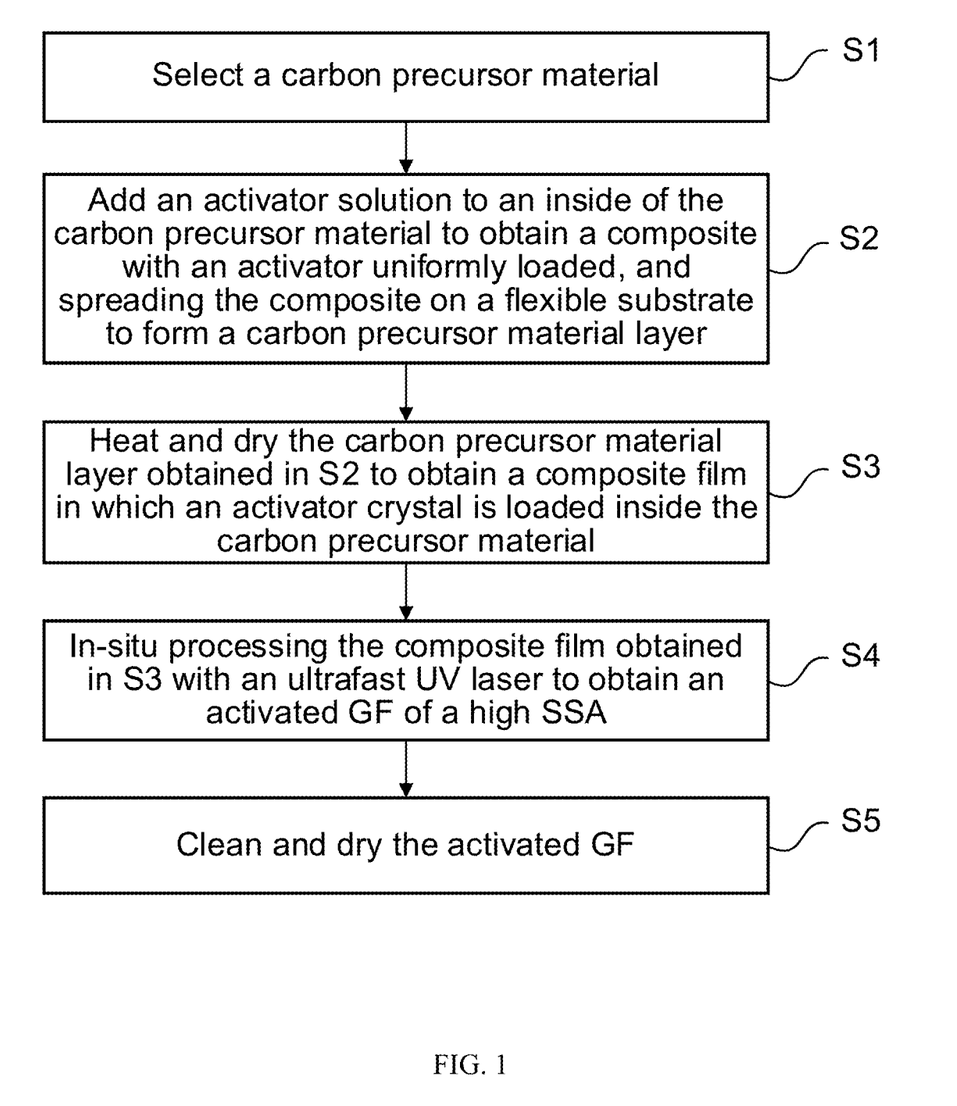
FIG. 1 is a flowchart of an embodiment of the present disclosure.

Specifically, as shown in FIG. 1 to FIG. 3, the method for integrally forming a GF of a high SSA by ultrafast UV laser processing of the present disclosure is as follows: an activator-loaded carbon precursor material 202 is spread with a coating knife 201 on the flexible substrate 204 and subjected to film formation to obtain a carbon precursor material layer, where the flexible substrate 204 has a rough surface, a superhydrophilic surface formed by plasma treatment, or a microstructure 203 formed by high-energy beam treatment; and the flexible substrate 204 is fixed on a substrate plate 205 and subjected to in-situ processing on a heating plate 301, where a picosecond UV laser beam 302 acts on the carbon precursor material layer by a focusing lens 303 of a laser scanning path 304 to finally obtain a GF of a high SSA.

The present disclosure is further illustrated below through examples and comparative examples.

Example 1

A method for integrally forming a GF of a high SSA by ultrafast UV laser processing was provided in this example, including the following steps:

S1: An activator is loaded on surface of a carbon precursor and amounts of the activator are as follows: potassium hydroxide was loaded on a surface of a 50 μm-thick PI tape at a concentration of 9.38 g/m².

S2: A coating knife of a coating thickness of 100 μm was used to evenly coat 150 μL of a potassium hydroxide solution of a concentration of 100 g/L on a surface of a PI tape (surface area: 40×40 mm²); and the PI tape with potassium hydroxide loaded on the surface was attached to a flexible substrate of a rough surface to form a carbon precursor material layer.

S3: The flexible substrate coated with the carbon precursor material layer was dried for 20 min in a vacuum drying oven at a temperature of 80° C. and a relative vacuum degree of −90 kPa until the potassium hydroxide was completely crystallized. In order to prevent the deliquescence of a potassium hydroxide crystal in the air, a heating plate was used during the subsequent laser induction and activation to continuously maintain an environment at 95° C. until laser processing was completed.

S4: A picosecond UV laser of a wavelength of 355 nm and a pulse width of 10 ps was set to have a power of 5.92 W, a scanning speed of 60 mm/s, a scanning pitch of 27 μm, and a defocus of 9 mm (spot diameter: about 250 μm), and progressive parallel scanning was conducted to achieve the laser induction and activation of porous graphene in a vacuum environment.

S5: The processed activated GF was soaked in dilute hydrochloric acid for 5 min and then in warm deionized water (60° C.) for 20 min, then soak-cleaned multiple times in cold deionized water until the residual potassium hydroxide was removed, and finally dried in a vacuum drying oven at a temperature of 60° C. and a relative vacuum degree of −90 kPa.

Example 2

A method for integrally forming a GF of a high SSA by ultrafast UV laser processing was provided in this example, including the following steps:

S1: Amounts of raw materials for a carbon precursor material and an activator were as follows: alkaline lignin: 1 g, PVA: 1 g, and potassium hydroxide: 2.5 g.

S2: 1 g of PVA and 8 mL of deionized water were mixed, heated in an 80° C. water bath, and magnetically stirred continuously for 1 h to obtain a transparent gel solution; 2.5 g of potassium hydroxide and 1 g of alkaline lignin were dissolved in 4 mL of deionized water, a resulting solution was added to the transparent gel solution, and a resulting mixed solution was heated in a 60° C. water bath and magnetically stirred continuously for 4 h to obtain a composite (gel-like) with the activator uniformly loaded; and a coating knife of a coating thickness of 100 μm was used to coat the gel-like composite on a flexible substrate of a rough surface to form a carbon precursor material layer.

S3: The flexible substrate coated with the carbon precursor material layer was first placed in the air for 12 h, and then dried for 20 min in a vacuum drying oven at a temperature of 80° C. and a relative vacuum degree of −90 kPa until the potassium hydroxide was completely crystallized. In order to prevent the deliquescence of a potassium hydroxide crystal in the air, a heating plate was used during the subsequent laser induction and activation to continuously maintain an environment at 95° C. until laser processing was completed.

S4: A picosecond UV laser of a wavelength of 355 nm and a pulse width of 10 ps was set to have a power of 5.92 W, a scanning speed of 60 mm/s, a scanning pitch of 27 μm, and a defocus of 9 mm (spot diameter: about 250 μm), and progressive parallel scanning was conducted to achieve the laser induction and activation of porous graphene in a vacuum environment.

S5: The processed activated GF was soaked in dilute hydrochloric acid for 5 min and then in warm deionized water (60° C.) for 20 min, then soak-cleaned multiple times in cold deionized water until the residual potassium hydroxide was removed, and finally dried in a vacuum drying oven at a temperature of 60° C. and a relative vacuum degree of −90 kPa.

Example 3

A method for integrally forming a GF of a high SSA by ultrafast UV laser processing was provided in this example, including the following steps:

S1: Amounts of raw materials for a carbon precursor material and an activator were as follows: alkaline lignin: 1 g, PVA: 1 g, and potassium hydroxide: 2.5 g.

S2: 1 g of PVA and 8 mL of deionized water were mixed, heated in an 80° C. water bath, and magnetically stirred continuously for 1 h to obtain a transparent gel solution; 2.5 g of potassium hydroxide and 1 g of alkaline lignin were dissolved in 4 mL of deionized water, a resulting solution was added to the transparent gel solution, and a resulting mixed solution was heated in a 60° C. water bath and magnetically stirred continuously for 4 h to obtain a composite (gel-like) with the activator uniformly loaded; and a coating knife of a coating thickness of 100 μm was used to coat the gel-like composite on a flexible substrate of a rough surface to form a carbon precursor material layer.

S3: The flexible substrate coated with the carbon precursor material layer was first placed in the air for 12 h, and then dried for 20 min in a vacuum drying oven at a temperature of 80° C. and a relative vacuum degree of −90 kPa until the potassium hydroxide was completely crystallized. In order to prevent the deliquescence of a potassium hydroxide crystal in the air, a heating plate was used during the subsequent laser induction and activation to continuously maintain an environment at 95° C. until laser processing was completed.

S4: A picosecond UV laser of a wavelength of 355 nm and a pulse width of 10 ps was set to have a power of 5.76 W, a scanning speed of 60 mm/s, a scanning pitch of 27 μm, and a defocus of 9 mm (spot diameter: about 250 μm), and progressive parallel scanning was conducted to achieve the laser induction and activation of porous graphene in an air environment.

S5: The processed activated GF was soaked in dilute hydrochloric acid for 5 min and then in warm deionized water (60° C.) for 20 min, then soak-cleaned multiple times in cold deionized water until the residual potassium hydroxide was removed, and finally dried in a vacuum drying oven at a temperature of 60° C. and a relative vacuum degree of −90 kPa.

Example 4

A method for integrally forming a GF of a high SSA by ultrafast UV laser processing was provided in this example, including the following steps:

S1: Amounts of raw materials for a carbon precursor material and an activator were as follows: alkaline lignin: 1 g, PVA: 1 g, and potassium hydroxide: 2.5 g.

S2: 1 g of PVA and 8 mL of deionized water were mixed, heated in an 80° C. water bath, and magnetically stirred continuously for 1 h to obtain a transparent gel solution; 2.5 g of potassium hydroxide and 1 g of alkaline lignin were dissolved in 4 mL of deionized water, a resulting solution was added to the transparent gel solution, and a resulting mixed solution was heated in a 60° C. water bath and magnetically stirred continuously for 4 h to obtain a composite (gel-like) with the activator uniformly loaded; and a coating knife of a coating thickness of 100 μm was used to coat the gel-like composite on a flexible substrate of a rough surface to form a carbon precursor material layer.

S3: The flexible substrate coated with the carbon precursor material layer was first placed in the air for 12 h, and then dried for 20 min in a vacuum drying oven at a temperature of 80° C. and a relative vacuum degree of −90 kPa until the potassium hydroxide was completely crystallized. In order to prevent the deliquescence of a potassium hydroxide crystal in the air, a heating plate was used during the subsequent laser induction and activation to continuously maintain an environment at 95° C. until laser processing was completed.

S4: A picosecond UV laser of a wavelength of 355 nm and a pulse width of 10 ps was set to have a power of 5.55 W, a scanning speed of 60 mm/s, a scanning pitch of 27 μm, and a defocus of 9 mm (spot diameter: about 250 μm), and progressive parallel scanning was conducted to achieve the laser induction and activation of porous graphene in an air environment.

S5: The processed activated GF was soaked in dilute hydrochloric acid for 5 min and then in warm deionized water (60° C.) for 20 min, then soak-cleaned multiple times in cold deionized water until the residual potassium hydroxide was removed, and finally dried in a vacuum drying oven at a temperature of 60° C. and a relative vacuum degree of −90 kPa.

Example 5

A method for integrally forming a GF of a high SSA by ultrafast UV laser processing was provided in this example, including the following steps:

S1: Amounts of raw materials for a carbon precursor material and an activator were as follows: alkaline lignin: 1 g, PVA: 1 g, and potassium hydroxide: 2 g.

S2: 1 g of PVA and 8 mL of deionized water were mixed, heated in an 80° C. water bath, and magnetically stirred continuously for 1 h to obtain a transparent gel solution; 2 g of potassium hydroxide and 1 g of alkaline lignin were dissolved in 4 mL of deionized water, a resulting solution was added to the transparent gel solution, and a resulting mixed solution was heated in a 60° C. water bath and magnetically stirred continuously for 4 h to obtain a composite (gel-like) with the activator uniformly loaded; and a coating knife of a coating thickness of 100 μm was used to coat the gel-like composite on a flexible substrate of a rough surface to form a carbon precursor material layer.

S3: The flexible substrate coated with the carbon precursor material layer was first placed in the air for 12 h, and then dried for 20 min in a vacuum drying oven at a temperature of 80° C. and a relative vacuum degree of −90 kPa until the potassium hydroxide was completely crystallized. In order to prevent the deliquescence of a potassium hydroxide crystal in the air, a heating plate was used during the subsequent laser induction and activation to continuously maintain an environment at 95° C. until laser processing was completed.

S4: A picosecond UV laser of a wavelength of 355 nm and a pulse width of 10 ps was set to have a power of 5.92 W, a scanning speed of 60 mm/s, a scanning pitch of 27 μm, and a defocus of 9 mm (spot diameter: about 250 μm), and progressive parallel scanning was conducted to achieve the laser induction and activation of porous graphene in an air environment.

S5: The processed activated GF was soaked in dilute hydrochloric acid for 5 min and then in warm deionized water (60° C.) for 20 min, then soak-cleaned multiple times in cold deionized water until the residual potassium hydroxide was removed, and finally dried in a vacuum drying oven at a temperature of 60° C. and a relative vacuum degree of −90 kPa.

Example 6

A method for integrally forming a GF of a high SSA by ultrafast UV laser processing was provided in this example, including the following steps:

S1: Amounts of raw materials for a carbon precursor material and an activator were as follows: chitin: 1 g, PAM: 1 g, and potassium carbonate: 4 g.

S2: 1 g of PAM and 8 mL of deionized water were mixed, heated in an 80° C. water bath, and magnetically stirred continuously for 1 h to obtain a transparent gel solution; 2.5 g of potassium carbonate and 1 g of hemicellulose were dissolved in 4 mL of deionized water, a resulting solution was added to the transparent gel solution, and a resulting mixed solution was heated in a 60° C. water bath and magnetically stirred continuously for 4 h to obtain a composite (gel-like) with the activator uniformly loaded; and
    a coating knife of a coating thickness of 30 μm was used to coat the gel-like composite on a flexible substrate of a rough surface to form a carbon precursor material layer.

S3: The flexible substrate coated with the carbon precursor material layer was first placed in the air for 12 h, and then dried for 5 min in a vacuum drying oven at a temperature of 100° C. and a relative vacuum degree of −90±2 kPa until the potassium carbonate was completely crystallized. In order to prevent the deliquescence of a potassium carbonate crystal in the air, a heating plate was used during the subsequent laser induction and activation to continuously maintain an environment at 95° C. until laser processing was completed.

S4: A picosecond UV laser of a wavelength of 355 nm and a pulse width of 5 ps was set to have a power of 5.92 W, a scanning speed of 50 mm/s, a scanning pitch of 24 μm, and a defocus of 9.5 mm (spot diameter: about 275 μm), and progressive parallel scanning was conducted to achieve the laser induction and activation of porous graphene in an inert gas/oxygen environment.

S5: The processed activated GF was soaked in dilute hydrochloric acid for 10 min and then in warm deionized water (70° C.) for 15 min, then soak-cleaned multiple times in cold deionized water until the residual potassium hydroxide was removed, and finally dried in a vacuum drying oven at a temperature of 50° C. and a relative vacuum degree of −90±2 kPa.

Comparative Example 1

A preparation method of a GF was provided in this comparative example, including the following steps:

S1: Amounts of raw materials for a carbon precursor material were as follows: alkaline lignin: 1 g, and PVA: 1 g.

S2: 1 g of PVA and 8 mL of deionized water were mixed, heated in an 80° C. water bath, and magnetically stirred continuously for 1 h to obtain a transparent gel solution; and 1 g of alkaline lignin was dissolved in 4 mL of deionized water, a resulting solution was added to the transparent gel solution, and a resulting mixed solution was heated in a 60° C. water bath and magnetically stirred continuously for 4 h to obtain a composite (gel-like) with the activator uniformly loaded.

S3: A coating knife of a coating thickness of 100 μm was used to coat the gel-like composite on a flexible PI paper substrate of a rough surface, and the flexible substrate coated with the carbon precursor was placed in the air for 12 h to remove moisture.

S4: A picosecond UV laser of a wavelength of 355 nm and a pulse width of 10 ps was set to have a power of 5.92 W, a scanning speed of 60 mm/s, a scanning pitch of 27 μm, and a defocus of 9 mm (spot diameter: about 250 μm), and progressive parallel scanning was conducted to achieve the laser induction of porous graphene.

Comparative Example 2

A preparation method of a GF was provided in this comparative example, including the following steps:

S1: Amounts of raw materials for a carbon precursor material and an activator were as follows: alkaline lignin: 1 g, PVA: 1 g, and potassium hydroxide: 2.5 g.

S2: 1 g of PVA and 8 mL of deionized water were mixed, heated in an 80° C. water bath, and magnetically stirred continuously for 1 h to obtain a transparent gel solution; 2.5 g of potassium hydroxide and 1 g of alkaline lignin were dissolved in 4 mL of deionized water, a resulting solution was added to the transparent gel solution, and a resulting mixed solution was heated in a 60° C. water bath and magnetically stirred continuously for 4 h to obtain a composite (gel-like) with the activator uniformly loaded; and
    a coating knife of a coating thickness of 100 μm was used to coat the gel-like composite on a flexible PI paper substrate of a rough surface to form a carbon precursor layer.

S3: The flexible substrate coated with the carbon precursor material layer was first placed in the air for 12 h, and then dried for 20 min in a vacuum drying oven at a temperature of 80° C. and a relative vacuum degree of −90 kPa until the potassium hydroxide was completely crystallized. In order to prevent the deliquescence of a potassium hydroxide crystal in the air, a heating plate was used during the subsequent laser induction and activation to continuously maintain an environment at 95° C. until laser processing was completed.

S4: A continuous carbon dioxide laser of a wavelength of 10.6 μm was set to have a power of 1.85 W, a scanning speed of 30 mm/s, a scanning pitch of 25.4 µm, and a spot diameter of about 250 µm, and progressive parallel scanning was conducted to achieve the laser induction and activation of porous graphene.

S5: The processed activated GF was soaked in dilute hydrochloric acid for 5 min and then in warm deionized water (60° C.) for 20 min, then soak-cleaned multiple times in cold deionized water until the residual potassium hydroxide was removed, and finally dried in a vacuum drying oven at a temperature of 60° C. and a relative vacuum degree of −90 kPa.

Compared with Example 2, no activator is added to the carbon precursor in Comparative Example 1; and compared with Example 2, the infrared (IR) continuous carbon dioxide laser was used instead of the picosecond UV laser for induction and activation of porous graphene in Comparative Example 2.

The SSA and sheet resistance were key factors for a high-SSA GF and could be used to assess a quality of an activated GF. The GFs obtained in Examples 1 to 6 and Comparative Examples 1 and 2 each were subjected to an SSA calculation and a sheet resistance test, and results were shown in the table 1 below.

TABLE 1

Results of sheet resistance

| Test sample | Test item | |
|---|---|---|
| | SSA ($m^2/g$) | Sheet resistance (Ω/square) |
| Example 1 | 1167 | 90 |
| Example 2 | 1152 | 95 |
| Example 3 | 1320 | 165 |
| Example 4 | 1280 | 180 |
| Example 5 | 680 | 70 |
| Example 6 | 1310 | 96 |
| Comparative Example 1 | 105 | 15 |
| Comparative Example 2 | 280 | 21 |

It can be seen from the test results in the table above that whether the activator is loaded on a surface of or inside the carbon precursor material in Example 1 or 2, a high-SSA GF can be prepared of a high-concentration activator and a high laser power; and in Examples 2, 3, and 4, the power of the picosecond UV laser decreases gradually, and thus the power for the picosecond UV laser induction and activation decreases gradually, but the tested SSA of the GF increases first and then decreases, and the sheet resistance gradually increases. This is because a medium laser power is conducive to the activation and etching of graphene and a too-high local temperature provided by a high power will destroy a structure of graphene.

In addition, as shown in FIG. 4 to FIG. 8, the high-SSA GF obtained in Example 2 has a high SSA, a small pore size distribution, and a small doping amount of nitrogen and oxygen.

Compared with Example 2, the amount of the activator in Example 5 is reduced, and the tested SSA and sheet resistance are also correspondingly reduced, indicating that the SSA and sheet resistance each are positively correlated with a content of the activator. This is because the increased participation of the activator in the reaction within an appropriate range is favorable for the activation and etching of graphene.

While a different carbon precursor material and activator is used and processing conditions are changed in Example 6, a high-quality and high-SSA GF can still be obtained.

The potassium hydroxide activator is not coated in Comparative Example 1, and the porous GF obtained has an SSA that is an order of magnitude lower than an SSA of the activated GF because no high-temperature activation is conducted.

The porous graphene is induced and activated with a mid-infrared (MIR) continuous carbon dioxide laser in Comparative Example 2, and a resulting GF has an SSA 5 times lower than an SSA of a GF induced and activated by a picosecond UV laser, indicating the processing advantages of the picosecond UV laser. This is because the picosecond UV laser can provide high photon energy (inversely proportional to the laser wavelength) and ultra-high laser energy density, which is conducive to the activation and etching of graphene.

The above examples are merely some implementations of the present disclosure, and the description thereof is specific and detailed, but should not be construed as limiting the patent scope of the present disclosure. It should be noted that those of ordinary skill in the art can further make several variations and improvements without departing from the concept of the present disclosure, and all of these fall within the protection scope of the present disclosure. Therefore, the protection scope of the present disclosure shall be subject to the appended claims.

What is claimed is:

1. A method for integrally forming a graphene film (GF) of a high specific surface area (SSA) by ultrafast ultraviolet (UV) laser processing, comprising the following steps:
   S1: selecting a carbon precursor material, wherein the carbon precursor material comprises a biomass/hydrogel composite;
   S2: adding an activator solution to an inside of the carbon precursor material to obtain a composite of an activator uniformly loaded, the composite being of a gel form, and spreading the composite of the gel form on a flexible substrate to form a carbon precursor material layer;
   S3: heating and drying the carbon precursor material layer obtained in S2 to obtain a composite film in which an activator crystal is loaded inside the carbon precursor material;
   S4: in-situ processing the composite film obtained in S3 by an ultrafast UV laser to obtain an activated GF of a high SSA; and
   S5: cleaning and drying the activated GF,
   wherein in S2, the carbon precursor material layer has a thickness of no less than 30 µm; a mass ratio of the carbon precursor material to the activator is 2:(1.5-4);
   progressive parallel scanning is conducted with the ultrafast UV laser at a scanning speed of 40 mm/s to 60 mm/s and a scanning pitch of 24 µm to 28 µm; a spot diameter of the ultrafast UV laser is 6 to 10 times the scanning pitch; and
   the ultrafast UV laser has a wavelength of no more than 355 nm and a pulse width of less than 12 ps; and
   in S1, the biomass/hydrogel composite is obtained by compounding a biomass of a hydrogel, wherein the biomass is one selected from the group consisting of lignin, cellulose, hemicellulose, and chitin and the hydrogel is one selected from the group consisting of gelatin, polyvinyl alcohol (PVA), and polyacrylamide (PAM).

2. The method according to claim 1, wherein in S2, the activator is any one selected from the group consisting of potassium hydroxide, zinc chloride, sodium hydroxide, potassium carbonate, copper chloride, and phosphoric acid.

3. The method according to claim 1, wherein in S2, the flexible substrate has a rough surface; or
- a smooth surface of the flexible substrate is processed by a high-energy beam to form a microstructure array; or
- a smooth surface of the flexible substrate is treated with plasma to form a superhydrophilic surface.

4. The method according to claim 1, wherein in S3, the carbon precursor material layer is heated and dried on a heating plate or in a vacuum drying oven to allow crystallization in the activator solution, wherein the heating is conducted at 60° C. to 100° C. for 5 min to 30 min.

5. The method according to claim 1, wherein the in-situ processing with the ultrafast UV laser is conducted in an air environment, a vacuum environment, an inert gas-protected environment, or an oxygen/inert gas mixed gas environment;
- an inert gas is any one selected from the group consisting of nitrogen, argon, and a sulfur hexafluoride gas; and
- in the oxygen/inert gas mixed gas environment, a mass ratio of oxygen to an inert gas is not higher than 0.25.

6. The method according to claim 1, wherein in S5, the activated GF is soaked for 5 min to 20 min in a neutralization solution and warm deionized water at 60° C. to 70° C. successively, then soak-cleaned multiple times in cold deionized water until resulting cold deionized water is neutral, and then dried in a vacuum drying oven at a temperature of 40° C. to 60° C. and a relative vacuum degree of −90±2 kPa.

* * * * *